(12) United States Patent
Eriksen et al.

(10) Patent No.: US 7,464,883 B2
(45) Date of Patent: Dec. 16, 2008

(54) VALVE FOR MOUNTING IN A CYLINDER WALL

(75) Inventors: Leif Eriksen, Hadsund (DK); Sven Lauritsen, Svenstrup J. (DK)

(73) Assignee: Hans Jensen Lubricators A/S, Hadsund (DK)

( * ) Notice: Subject to any disclaimer, the term of this patent is extended or adjusted under 35 U.S.C. 154(b) by 250 days.

(21) Appl. No.: 10/526,558

(22) PCT Filed: Oct. 22, 2003

(86) PCT No.: PCT/DK03/00717

§ 371 (c)(1),
(2), (4) Date: Mar. 4, 2005

(87) PCT Pub. No.: WO2004/038189

PCT Pub. Date: May 6, 2004

(65) Prior Publication Data

US 2006/0130800 A1    Jun. 22, 2006

(30) Foreign Application Priority Data

Oct. 22, 2002    (DK) .............................. 2002 01605

(51) Int. Cl.
*B05B 1/02* (2006.01)
(52) U.S. Cl. .............. 239/533.1; 239/533.7; 239/533.9; 239/533.12; 123/302; 123/305
(58) Field of Classification Search .............. 239/533.1, 239/533.7, 533.2, 533.8, 533.9, 533.12, 489, 239/460, 533.11; 123/276, 301, 298, 302, 123/305
See application file for complete search history.

(56) References Cited

U.S. PATENT DOCUMENTS

| | | | | | |
|---|---|---|---|---|---|
| 1,749,975 | A | * | 3/1930 | Groff | 239/87 |
| 1,999,967 | A | * | 4/1935 | Miller et al. | 137/493.3 |
| 3,309,024 | A | * | 3/1967 | Maddalozzo | 239/5 |
| 3,559,892 | A | * | 2/1971 | De Luca | 239/533.4 |
| 4,382,553 | A | * | 5/1983 | Thoma et al. | 239/533.9 |
| 4,721,080 | A | * | 1/1988 | Moriyasu et al. | 123/276 |
| 5,740,777 | A | * | 4/1998 | Yamamoto et al. | 123/305 |
| 5,950,596 | A | * | 9/1999 | Kollmann | 123/298 |

(Continued)

FOREIGN PATENT DOCUMENTS

DE    413750    5/1925

(Continued)

*Primary Examiner*—Len Tran
*Assistant Examiner*—Trevor E. McGraw
(74) *Attorney, Agent, or Firm*—James Creighton Wray; Clifford D. Hyra

(57) ABSTRACT

A valve (10) is described for use in oil injection of an oil mist (8) for lubricating/flushing cylinders in large engines and arranged with mounting means (14) for fastening in a cylinder wall (2) with a valve stem (12, 13) extending through the cylinder wall and with a nozzle outlet (6) at the inner end of the valve stem. A valve is made, the spray direction of which may be adjusted after mounting. Therefore, the valve is peculiar in that the nozzle outlet (6) is disposed in the inner valve stem part (13) which is rotatable relative to an outer valve stem part (12). The outer valve stem part (12) is fastened to or made as an integral part of the mounting means (14).

10 Claims, 10 Drawing Sheets

U.S. PATENT DOCUMENTS

| | | | |
|---|---|---|---|
| 6,045,063 A * | 4/2000 | Koike et al. | 239/533.3 |
| 6,161,781 A * | 12/2000 | Kojima et al. | 239/533.12 |
| 6,199,538 B1 * | 3/2001 | Aota et al. | 123/470 |
| 6,216,662 B1 * | 4/2001 | Sapsford | 123/301 |
| 6,622,693 B2 * | 9/2003 | Arndt et al. | 123/299 |
| 2002/0152995 A1 * | 10/2002 | Kato | 123/470 |

FOREIGN PATENT DOCUMENTS

| | | | |
|---|---|---|---|
| DE | 3044255 | | 6/1982 |
| GB | 128651 | | 8/1972 |
| JP | 61/197757 | | 9/1986 |
| JP | 19860902 A | * | 9/1986 |
| JP | 61197757 | * | 9/1986 |
| JP | 8/312503 | | 11/1996 |
| WO | WO 92/20909 | | 11/1992 |
| WO | WO 00/28194 | | 5/2000 |
| WO | WO 02/35068 | | 5/2002 |

* cited by examiner

VALVE FOR MOUNTING IN A CYLINDER WALL

BACKGROUND OF THE INVENTION

The present invention concerns a valve for use in injecting oil for lubricating/flushing cylinders in large engines and arranged with mounting means for fastening in a cylinder wall with a valve stem extending through the cylinder wall, and with at least one nozzle outlet at the inner end of the valve stem.

The invention particularly concerns a valve or injection unit intended for use in cylinder lubrication of motor cylinders in large diesel engines, particularly marine engines. In such systems, the valve or the injection unit may include a dosing unit mounted directly on the individual valve. In such lubricating systems, previously the valve has been intended for introducing an injection jet in the form of directionally oriented oil mist lubrication. Disclosures of examples of this technique are known e.g. from WO 00/28194 and WO 02/35068, which publications are hereby incorporated by reference.

It is noted that in the present application, the term valve is used. By using such a term in the present application is envisaged a unit that may also be said to be an injection unit. Such injection unit may optionally include a dosing unit or be adapted as an injection unit without dosing in the valve/injection unit itself. The expression valve thus covers a machine part extending through the cylinder wall and connecting one or more nozzle outlets or oil injection orifices at an end inside the cylinder with oil connection openings on a part outside the cylinder wall.

Many examples of valves of the type mentioned in the introduction are known. The valve is thus connected with a supply source for oil which is sprayed under pressure into the interior of the cylinder at a given time adjusted to the work stroke of a piston in the cylinder.

The valves are disposed in a number around the circumference of a cylinder. The valves are usually disposed in radially or largely radially oriented mounting holes in the cylinder wall and extend through this cylinder wall. The valves are fastened to the cylinder wall via mounting means, e.g. screw thread on the valve stem itself, or a mounting bushing screwed into the screw holes formed in the cylinder wall. The valve is clamped and secured in a given position by tightening the screw thread connection. This may provide uncertainty of the final angular position of the valve when this is secured in the cylinder wall.

The valves are provided with one or more nozzle outlets that are transversely oriented relative to the valve stem, and which are directed in one or more directions wanted for the actual mounting hole for providing lubrication/flushing with desired orientation inside the cylinder. Thus there are different orientation of the valves in different mounting holes. Thus every valve is made with individual shape adapted the contemplated mounting hole.

Previously known valves, which subsequent to mounting have a desired spray direction setting, demanded an extensive machining of the cylinder, and there was the risk that the valves could be turned wrongly. This is unfavourable as here there is need for individual adaptation. This is unsuitable from a manufacturing point of view. Furthermore, there is no possibility of setting spray direction after mounting.

It is the purpose of the present invention to indicate a valve where these drawbacks are relieved, and which is provided so that the orientation of the spray direction(s) of the valve may be determined after mounting in the mounting hole in the cylinder wall, and which is preferably arranged so that it may be used with minimal machining of existing mounting holes instead of a prior art valve.

SUMMARY OF THE INVENTION

This is achieved according to the present invention with a valve of the kind mentioned in the introduction, which is peculiar in that the at least one nozzle outlet is disposed in the inner valve stem part which is rotatable relative to an outer valve stem part, and that the outer valve stem part is fastened to or made as an integral part of the mounting means.

The valve according to the invention is designed so that a minimal machining of existing mounting holes on existing motors are required, as the machining is reduced compared with previously known, corresponding valves. At the same time, the valve has the advantage that its spray direction(s) can be adjusted after mounting.

The new valve may particularly be used for lubricating/flushing with individually oriented or asymmetrically oriented injection jet(s), where the angular setting of nozzle outlet(s) of the valve is only adjusted after mounting the valve in the mounting hole. This occurs by rotating the inner valve stem part in relation to the outer valve stem part, and then securing the two valve stem parts mutually by activating means, preferably screws, for clamping the valve stem parts together. The adjusting of the inner valve stem part occurs by rotating the part which is rotationally fixed with the inner valve stem part and which is situated outside the cylinder wall.

As the outer valve stem part is secured in the cylinder wall, the direction of the injection jet or jets may be adjusted in a very simple way with a desired orientation after mounting at the actual position in the cylinder wall. The valve may, however, also be used for oil injection with symmetrically oriented injection jet(s) that do not require adjusting of the orientation/angle of the valve after mounting the valve.

The new valve does thus only need to be made in one embodiment which does not need to be adapted individually according to the intended position.

When stubs for valve oil supply and oil discharge are disposed in the rotatable valve stem, oil connections to source of supply and return flow will be mounted after adjusting the valve. This is easily effected by using hydraulic pipes or flexible oil hoses.

According to a further embodiment, the valve is peculiar in that the rotatable valve stem part includes two annular clamping faces disposed at each side of an annular flange on the fixed valve stem part, and which is provided with means for clamping the clamping faces against the flange for securing mutual position of the two valve stem parts. Hereby is achieved a technically simple solution on a valve with the possibility of mutually rotating the two valve stem parts, as the clamping faces may function as sliding faces in the unclamped state.

With the valve according to the invention, one may only loosen a couple of screws and set/turn the valve to lubricate/flush in the wanted direction.

According to a further embodiment, the valve is peculiar in that the outer valve stem part/mounting means includes a bushing provided with external screw thread and with an inner bore for rotatable accommodation of the inner valve stem part. Via the screw thread, the valve may thus be screwed firmly into an existing threaded hole in the cylinder wall.

The valve may include plural nozzle outlets as it may hereby cover a larger area of the cylinder wall with the oil mists or injection jets discharged transversely relative to the valve stem and directed towards the cylinder wall around the valve.

According to a further embodiment, the valve according to the invention is peculiar in that it includes an oil filter. It is hereby possible to filter the oil in the valve before it reaches the nozzle outlet/outlets.

DESCRIPTION OF THE DRAWING

The invention will now be explained more closely with reference to the accompanying drawing, where:

Brief Description Of The Drawings

Figure 1:
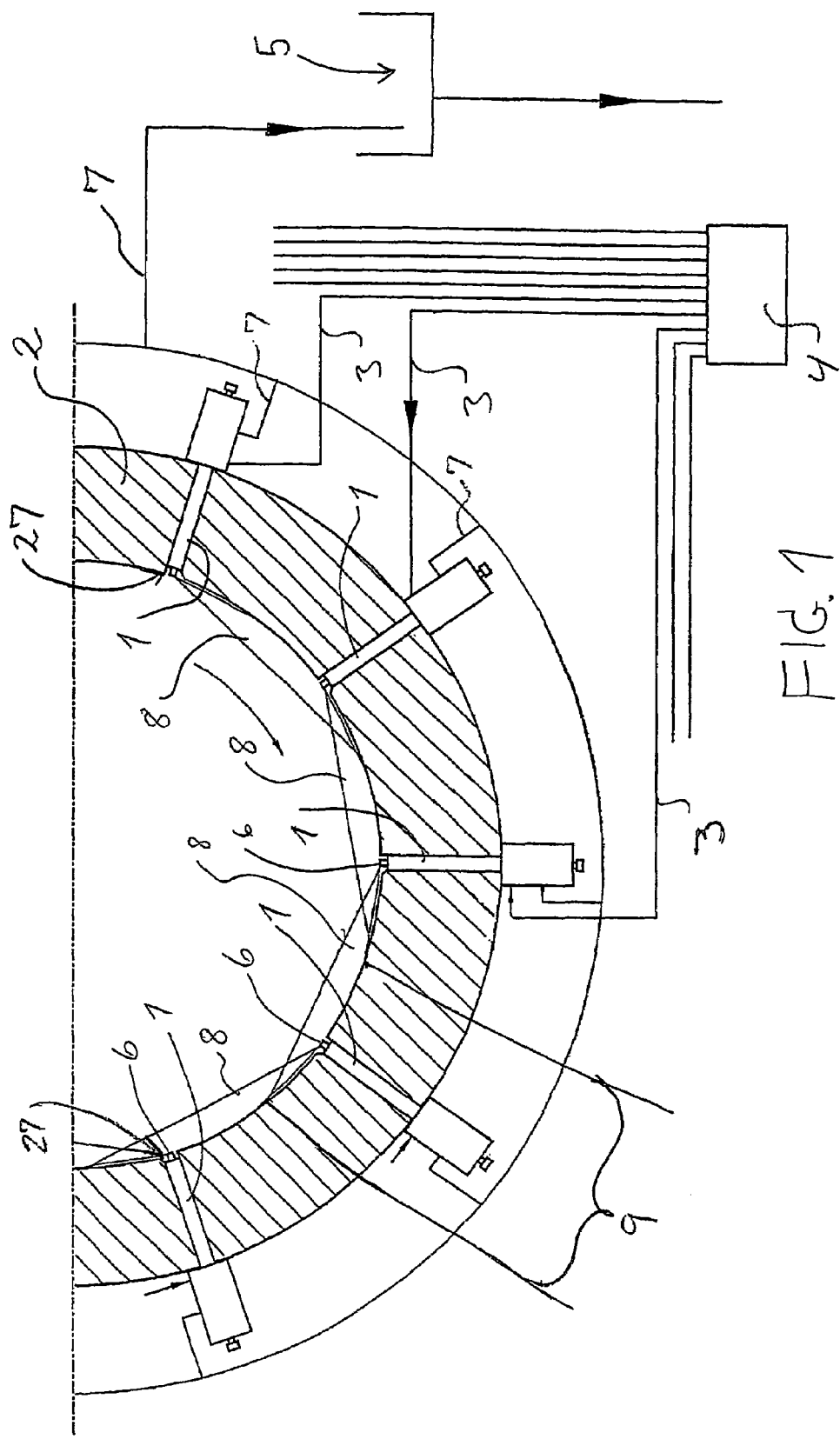
Figure 2:
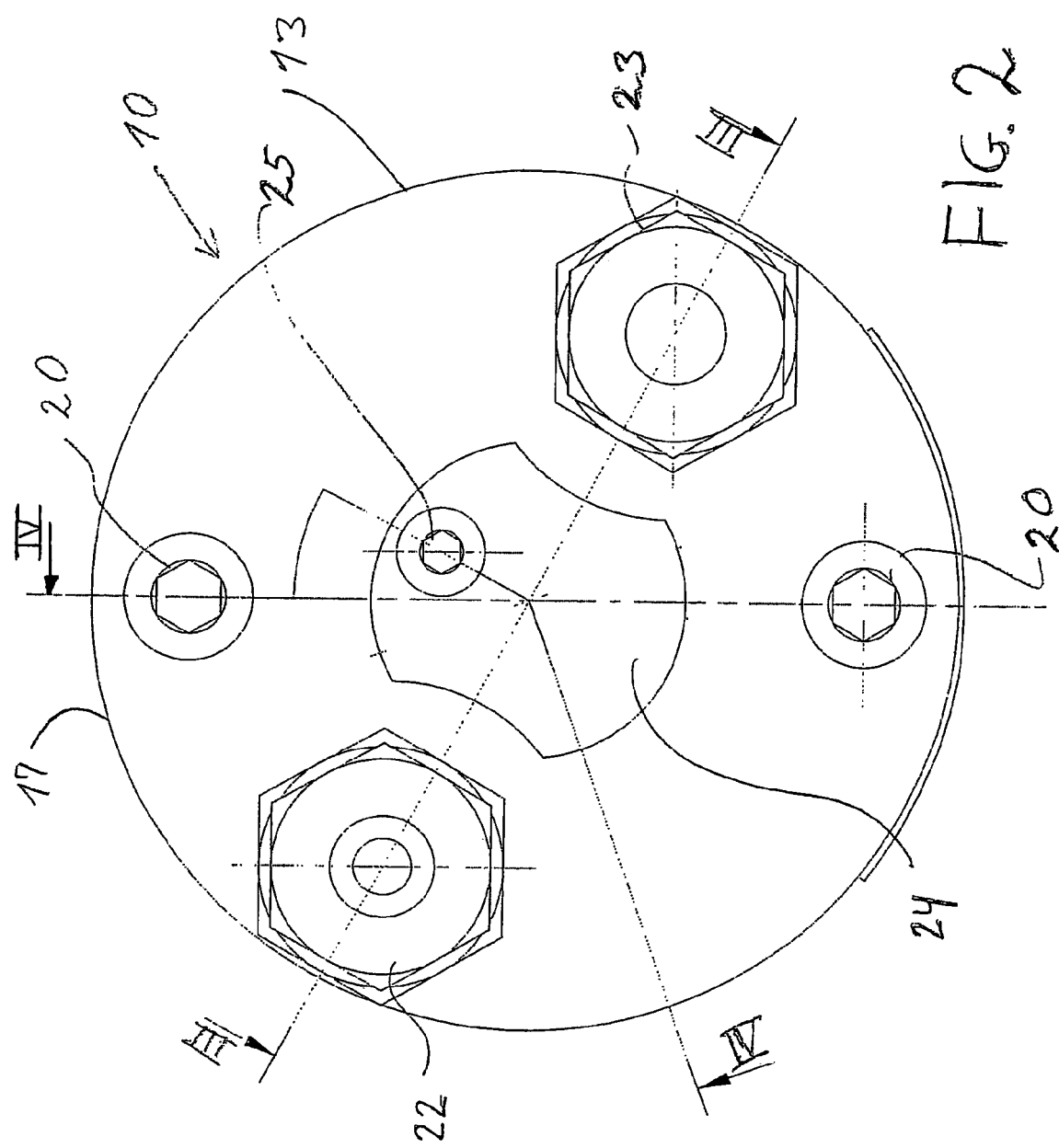
Figure 3:
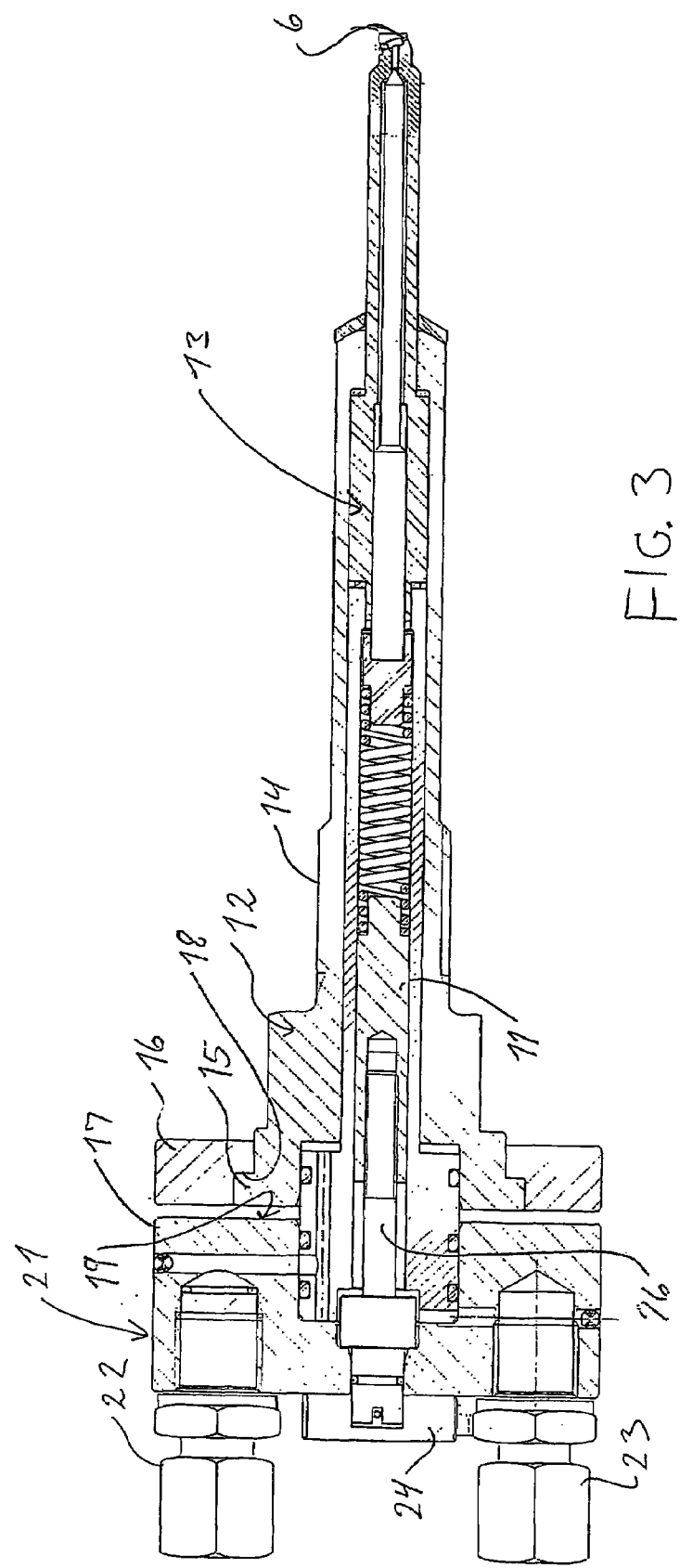
Figure 4:
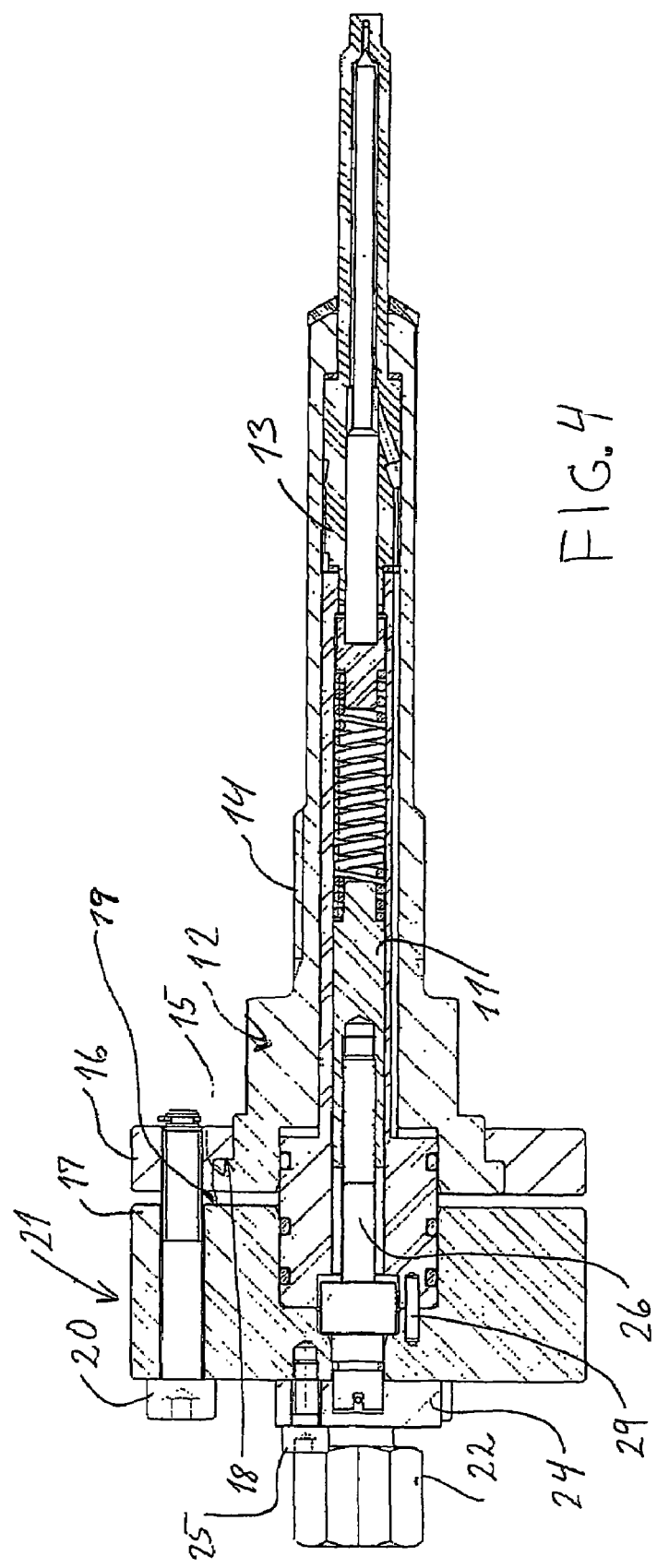
Figure 5:
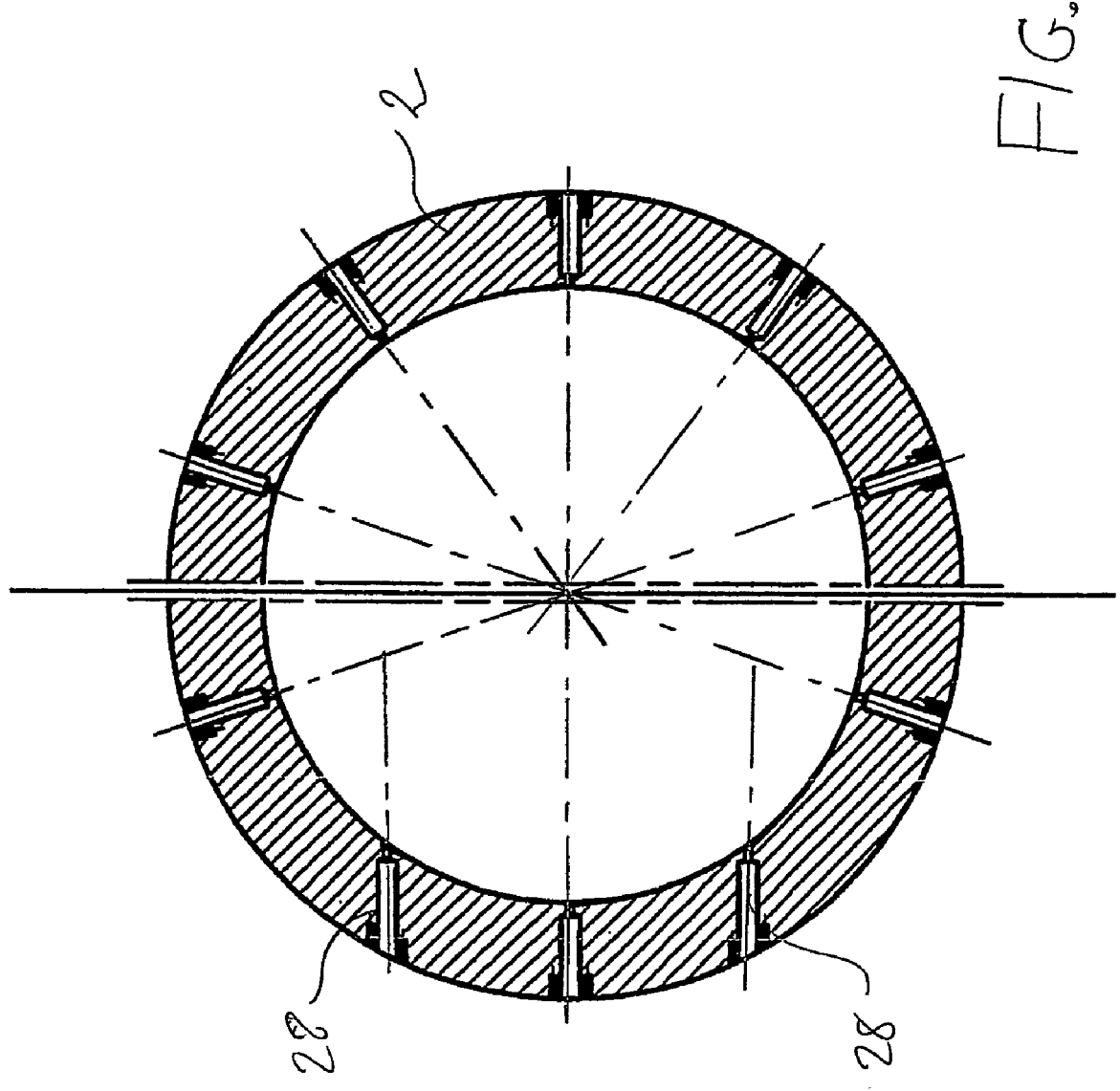
Figure 6:
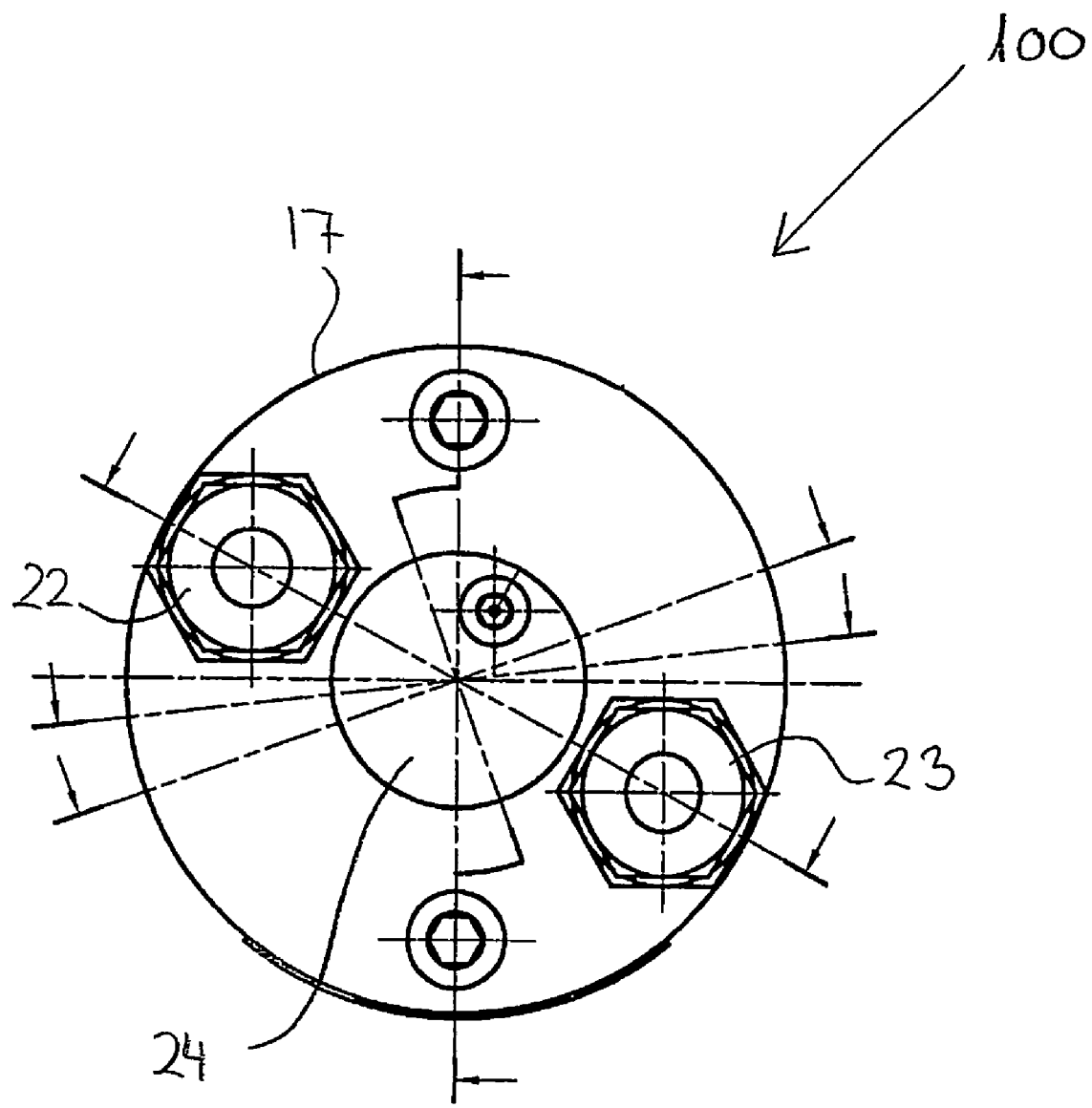
Figure 7:
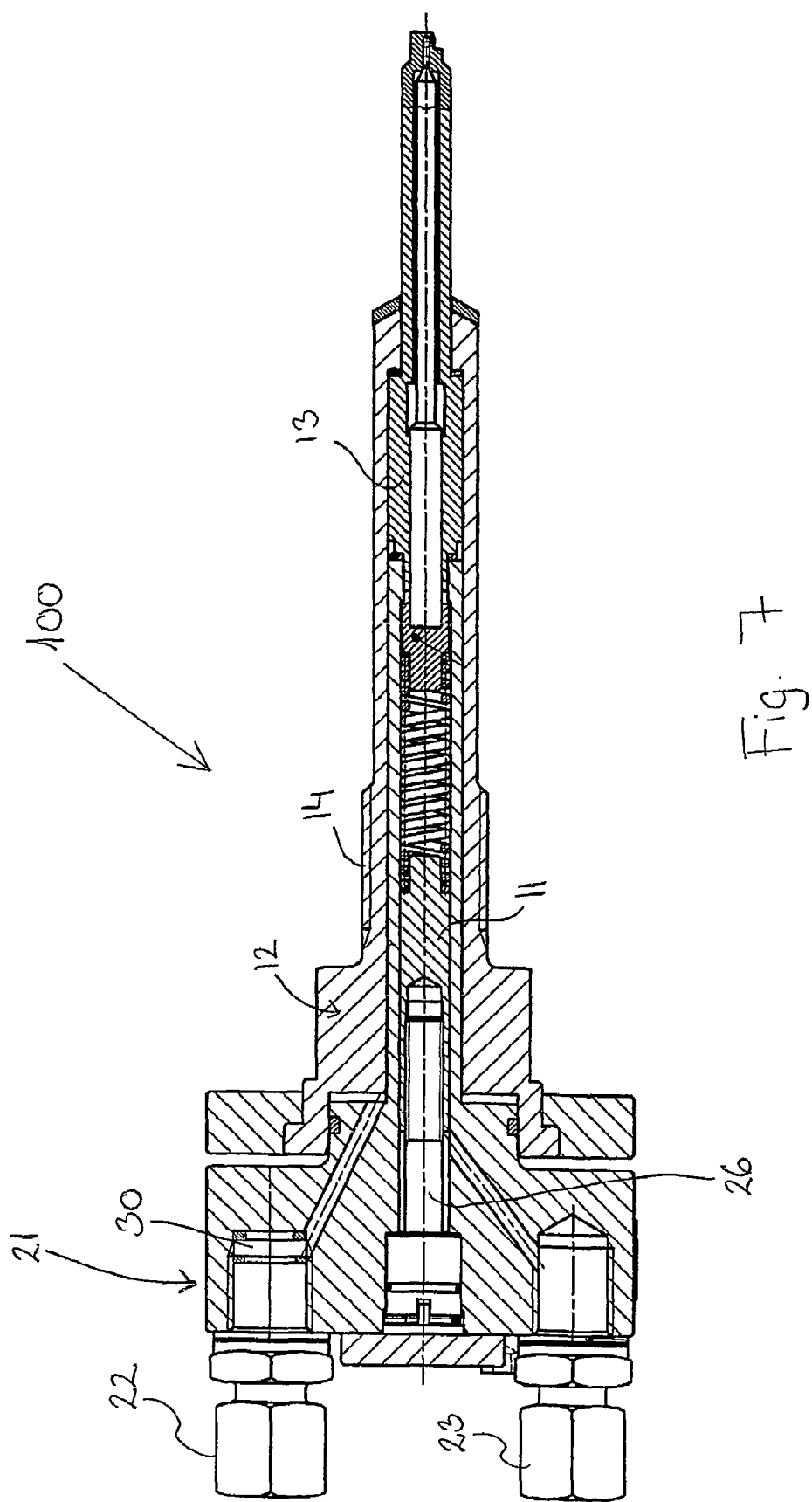
Figure 8:
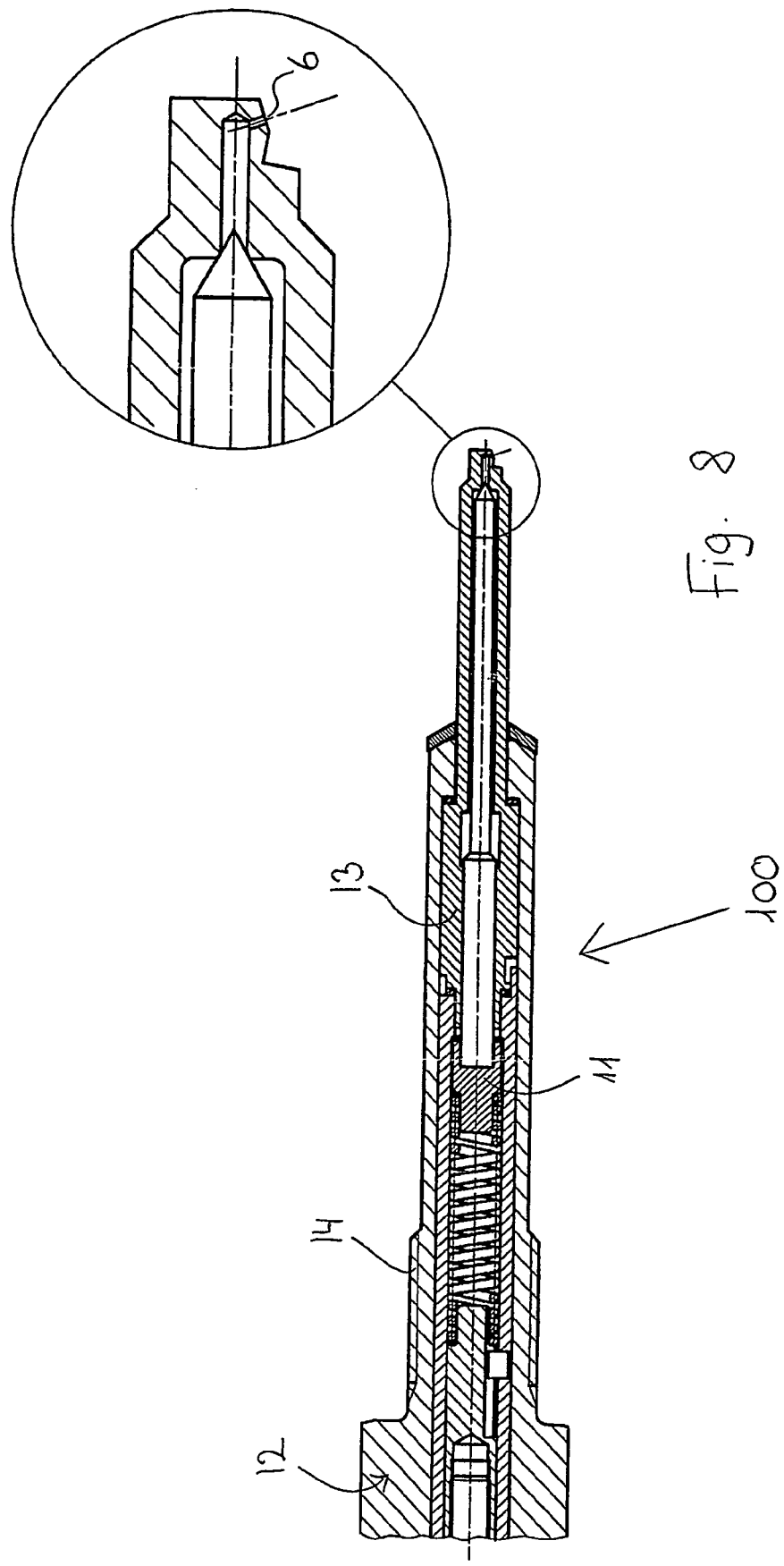
Figure 9:
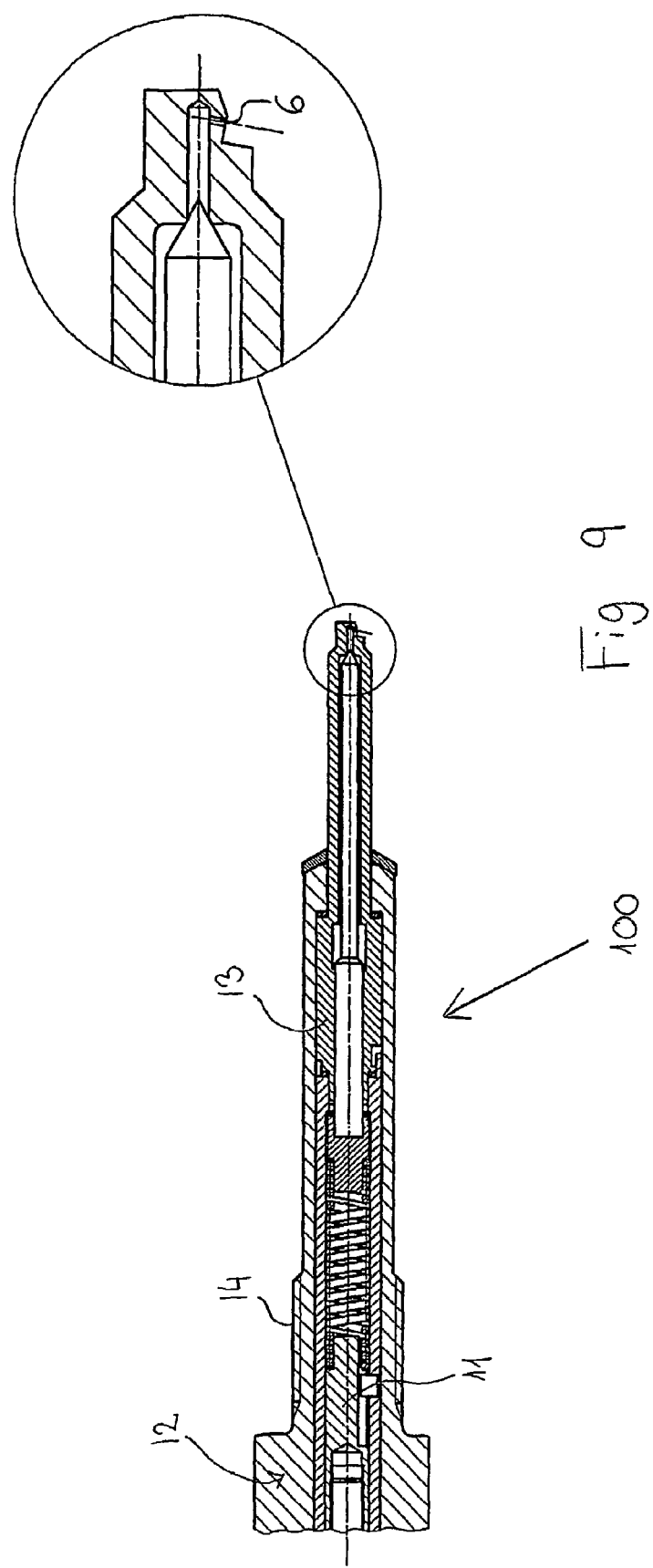
Figure 10:
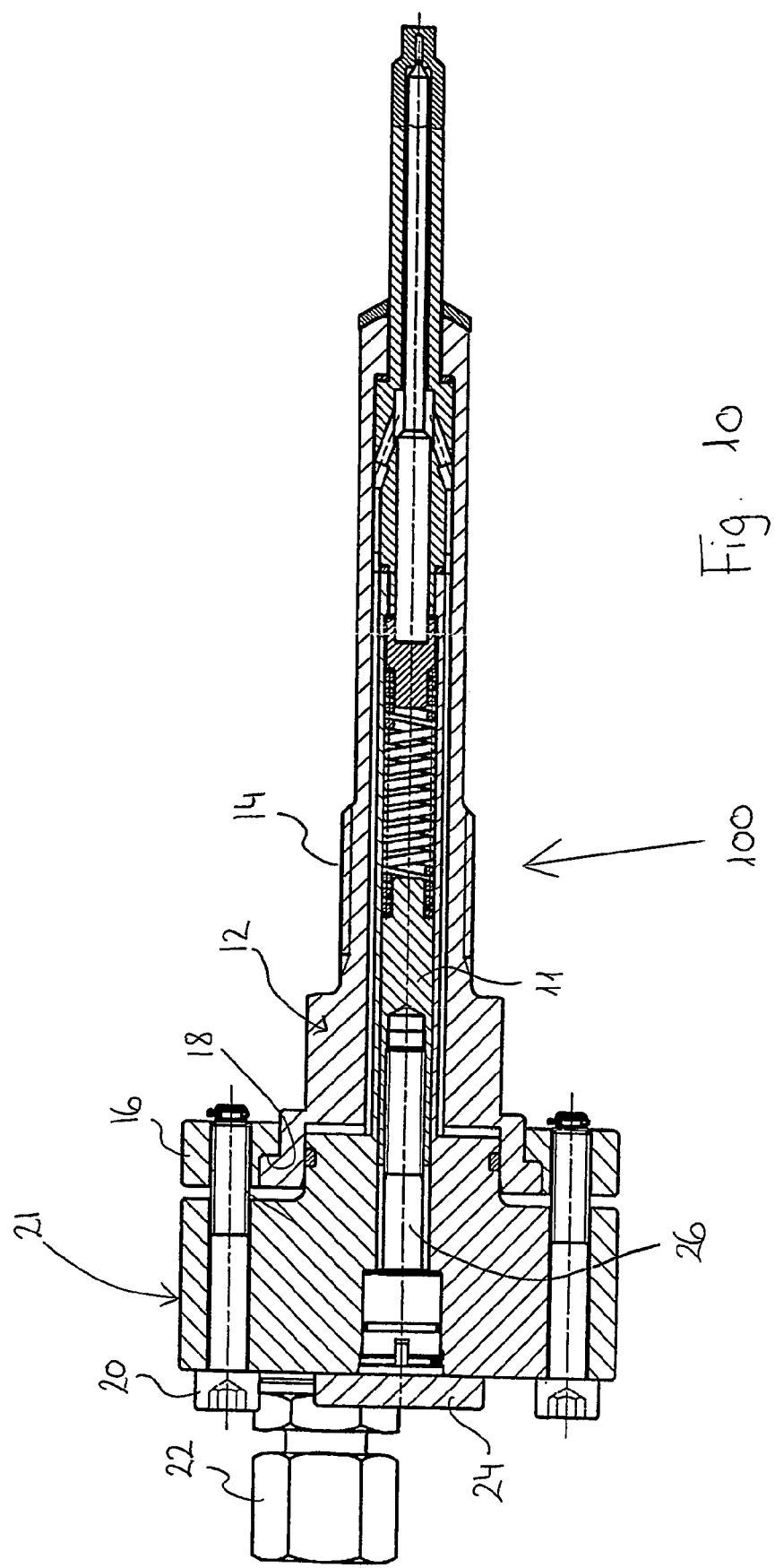

FIG. 1 shows a schematic view, partly in section, of a lubricating system in which a valve according to the invention is used, FIG. 2 shows an end view of a valve according to the invention, FIG. 3 shows a first sectional view through the valve shown in FIG. 2, FIG. 4 shows a second sectional view through the valve shown in FIG. 2, FIG. 5 shows a sectional view through a cylinder wall with examples of orientation of mounting holes for the valve according to the invention, FIG. 6 shows an end view of a further embodiment of a valve according to the invention, FIG. 7 shows a first sectional view through the valve shown in FIG. 6, FIG. 8 shows a second and partial sectional view through valve shown in FIG. 6, FIG. 9 shows a third and partial sectional view through the valve shown in FIG. 6, and FIG. 10 shows a fourth sectional view of the valve shown in FIG. 6.

DETAILED DESCRIPTION OF THE PREFERRED EMBODIMENTS

In the different Figures of the drawing, identical or corresponding elements are designated with the same reference. Therefore, no detailed explanation of such elements will be given in connection with each Figure.

FIG. 1 shows a system with a number of valves 1 provided in a cylinder wall 2. The valves 1 are mounted in mounting holes 27 which are oriented radially in the cylinder wall in this embodiment.

The valves 1 are via hydraulic pipes or via flexible oil hoses 3 connected with an oil pump 4 that contains individual pump units for each valve 1 and is connected with an oil tank 5.

At one end, each valve 1 has a nozzle outlet 6 disposed in the cylinder wall immediately within the inner surface of the cylinder wall 2. Through the nozzle outlet 6, the oil is atomised when the pressure in the oil pipe 3 reaches a predetermined level. At the part provided outside the cylinder wall, the valves are connected with hydraulic pipes or with flexible return hoses 7 for oil to be returned to the oil tank 5. The valves are discharging a transverse oil mist or injection jet 8 in relation to the valve stem that will cover an area 9 of the cylinder wall to which the oil mist is directed.

The FIGS. 2-4 show a valve 10 of another type than the valve 1 shown in FIG. 1. The valve 10 has a construction in principle as the valve described in WO 02/35068.

The valve 10 may optionally be connected with a motor (not shown here) for setting closing pressure of a thrust block 11 in the valve 10.

In the shown embodiment, the thrust block 11 and set screw 26 are covered by a cover 24 fastened to the valve with a screw 25. The lid 24 is mounted after the closing pressure of the thrust block 11 has been set by rotating the threaded set screw 26.

The mode of operation for and the individual parts in the valve 10 are described in WO 02/35/068 which is hereby incorporated by reference. Therefore, a detailed description not repeated here.

The valve 10 has an outer valve stem part 12 and an inner valve stem part 13 rotatably supported therein, the part 13 capable of being held in an arbitrary angular position so that the nozzle outlet 6 is disposed in a desired rotational angular position relative to the outer valve stem part 12 secured in the cylinder wall 2. The outer valve stem part 12 has mounting means in the form of an external thread 14 interacting with a thread in a mounting hole in the cylinder wall 2.

The outer valve stem part 12 has an annular flange 15 situated between two annular clamping jaws 16, 17 with clamping faces 18 and 19, respectively, at each side of the flange 15. The clamping faces 16, 17 may be clamped by means of screws 20 for securing the flange 15 and thereby the inner valve stem part 13 at a certain angular position in relation to the outer valve stem part 12 and thereby also relative to the cylinder wall 2. Hereby the nozzle outlet 6 is provided a desired orientation for covering the desired area 9 of the inner surface of the cylinder wall.

In the part 21 of the inner valve stem part 13 provided outside the cylinder wall, there are stubs 22, 23 for mounting oil pipes or the flexible oil hoses 3, 7 for oil supply and return flow, respectively. Via a pin 29, the inner valve stem part 13 is rotationally fixed with the clamping jaw 17 forming part of the part 21 provided outside the cylinder wall. By rotating the clamping jaw 21, the inner valve stem part 13 may thus be rotated relatively to the outer valve stem part 12 after it has been mounted in the cylinder wall 2.

In FIG. 5 is shown a section through a cylinder wall 2. Mounting holes 28 are here illustrated oriented at different angles relative to a radial orientation as shown for the mounting holes 27 in FIG. 1.

The FIGS. 6-10 show a valve 100 having a construction in principle corresponding to the valve shown in FIGS. 2-4 and as described in WO 02/35068.

In FIG. 6 is shown an end view of the valve as seen from the outer side of the cylinder wall. In the Figure, the part 21 provided outside the cylinder wall with the stubs 22, 23 for mounting the oil pipes or the flexible oil hoses 3, 7 for oil supply and return flow, respectively, appears. Furthermore, sectional lines for the sectional views in FIGS. 7-10 are shown.

The valve 100 includes two nozzle outlets 6 as it appears from FIGS. 8 and 9 and the associated enlarged detail views. However, it is to be mentioned that the valve can include more than two nozzle outlets 6. The shown embodiments with one and two nozzle outlets 6 are thus not limiting for the actual number of nozzle outlets that may be used in a valve according to the invention.

The valve is provided with a filter 30 disposed in the valve in immediate association with the stub 22 which is intended for mounting the oil pipes or the flexible oil hoses 3 for oil supply. The supplied oil is filtered before reaching the nozzle outlets. The risk of complete or partial clogging of the nozzle outlets 6 is hereby avoided. A complete or partial clogging may give rise to insufficient coverage of the desired area 9 of the inner surface of the cylinder wall. By using the filter 30, this risk is avoided. A filter 30 may correspondingly be placed in the embodiments shown in FIGS. 1-4.

The orientations for the mounting holes shown in FIG. 5 are just selected randomly, and there may thus be other orientations of the mounting holes 28 also. In these differently oriented mounting holes, there may be mounted valves 1, 10 which are identical in each mounting hole. Yet angular adjustments of the valve under consideration of the individual orientation of the mounting holes are performed.

The invention claimed is:

1. Valve for use in injecting oil for lubricating or flushing cylinders in large engines and arranged with mounting means for fastening in a cylinder wall with a valve stem extending through the cylinder wall, and with at least one nozzle outlet at the inner end of the valve stem, wherein the at least one nozzle outlet is disposed in the inner valve stem part which is rotatable relative to an outer valve stem part, and that the outer valve stem part is fastened to or made as an integral part of the mounting means, wherein stubs for oil supply to the valve and oil discharge from the valve are disposed in the rotatable valve stem part.

2. Valve according to claim 1, characterised in that the rotatable valve stem part includes two annular clamping faces disposed at each side of an annular flange on the outer valve stem part, and which is provided with means for clamping the clamping faces against the flange for securing mutual position of the two valve stem parts.

3. Valve according to claim 1, characterised in that at the least one nozzle outlet is provided for forming one or more injection jets or oil mists transversely of the valve stem.

4. Valve according to claim 1, characterised in that the at least one nozzle outlet is provided for forming one or more injection jets or oil mists oriented symmetrically relatively to the valve stem.

5. Valve according to claim 1, characterised in that it includes an oil filter.

6. Valve for use in injecting oil for lubricating or flushing cylinders in large engines and arranged with mounting means for fastening in a cylinder wall with a valve stem extending through the cylinder wall, and with at least one nozzle outlet at the inner end of the valve stem, wherein the at least one nozzle outlet is disposed in the inner valve stem part which is rotatable relative to an outer valve stem part, and that the outer valve stem part is fastened to or made as an integral part of the mounting means, wherein the mounting means includes a bushing provided with external screw thread and with an inner bore for rotatable accommodation of the inner valve stem part.

7. Valve according to claim 6, characterised in that the rotatable valve stem part includes two annular clamping faces disposed at each side of an annular flange on the outer valve stem part, and which is provided with means for clamping the clamping faces against the flange for securing mutual position of the two valve stem parts.

8. Valve according to claim 6, characterised in that at the least one nozzle outlet is provided for forming one or more injection jets or oil mists transversely of the valve stem.

9. Valve according to claim 6, characterised in that the at least one nozzle outlet is provided for forming one or more injection jets or oil mists oriented symmetrically relatively to the valve stem.

10. Valve according to claim 6, characterised in that it includes an oil filter.

* * * * *